March 24, 1970 JOJI YAMAGA ET AL 3,501,956
MEASURING APPARATUS FOR SUDDENLY VARYING GAS TEMPERATURES
IN INTERNAL RECIPROCATING ENGINES
UTILIZING ULTRASONIC WAVES
Filed June 28, 1967     12 Sheets-Sheet 1

INVENTORS
Joji Yamaga
Kenji Shibata
BY
ATTORNEY

United States Patent Office 3,501,956
Patented Mar. 24, 1970

3,501,956
MEASURING APPARATUS FOR SUDDENLY VARYING GAS TEMPERATURES IN INTERNAL RECIPROCATING ENGINES UTILIZING ULTRASONIC WAVES
Joji Yamaga and Shuji Shibata, Tokyo, Japan, assignors to Agency of Industrial Science and Technology, Tokyo, Japan, a government corporation of Japan
Continuation-in-part of application Ser. No. 379,630, July 1, 1964. This application June 28, 1967, Ser. No. 649,529
Claims priority, application Japan, Aug. 31, 1963, 38/45,522
Int. Cl. G01k 3/10
U.S. Cl. 73—339                                                  4 Claims

ABSTRACT OF THE DISCLOSURE

A gas temperature measuring apparatus for measuring suddenly varying gas temperatures in internal reciprocating engines having therein a constant frequency sound generator discharging constant frequency sound waves into a varying temperature gas in a piston cylinder. The sound waves undergo a change in frequency when passing through the gas due to the temperature variations therein and are detected by a receiver and detector combination by which the frequency change is determined and used to determine the gas temperatures.

---

The present invention is a continuation-in-part application of copending patent application Ser. No. 379,630, filed July 1, 1964, entitled Gas-Temperature Measuring Apparatus by Ultra Sonic Waves, now abandoned.

The present invention relates to an apparatus for measuring combustion gas temperatures in reciprocating engines, in general, and to a suddenly varying combution gas temperature measuring apparatus utilizing sound waves and ultrasonic waves in reciprocating engines, in particular.

It is one of the most difficult problems to measure the transient temperature of the combustion gas in reciprocating engines. This is due to the fact that the temperature change in the gas occurs suddenly and the temperature itself is relatively high.

Heretofore thermocouples, electric resistance thermometers and optical thermometers have been used for measuring gas temperature. However, these measuring tools are defective for temperature measurement exceeding 1500° C. Above such temperatures thermocouples do not function at all, electric resistance thermometers exhibit decreased durability and optical thermometers produce inaccurate measurements.

There exists methods of measuring gas temperatures by acoustic velocity techniques. However, such methods are complicated in handling and some do not yield precise values because of interference of the sound waves. Furtheromre, known acoustic velocity techniques simply measure substantially static or constant temperatures and do not provide a method for determining suddenly varying gas temperatures.

The measurement of suddenly varying gas temperature changes, which occur in the combustion gas or internal combustion engines, is extremely difficult because the temperature change is rapid and the temperature levels are very high. Present techniques for measuring sudden variations in gas temperatures in internal combustion engines have used thermocouples or electro resistance thermometers. However, these techniques are not satisfactory and produce inaccurate temperature measurements because of high heat loss, large heat capacity and time delay.

It is an object of the present invention to provide an apparatus which will accurately measure suddenly varying combustion gas temperatures in internal combustion engines by an acoustic velocity technique.

It is another object of the present invention to provide an apparatus for measuring instantaneous combustion gas temperatures during suddenly varying gas temperature conditions in internal combustion engines using ultrasonic waves.

It is still another object of the present invention to provide an apparatus for precisely measuring suddenly varying gas temperatures in reciprocating engines by using constant frequency acoustic waves and detecting the frequency of the acoustic waves received after passing through the gas.

It is yet another object of the present invention to provide a gas temperature measuring apparatus for measuring the instantaneous temperature of suddenly varying gas temperatures in reciprocating engines by detecting the frequency of received ultrasonic waves passing through the gas emitted from a constant frequency ultrasonic generator.

With these and other objects in view, which will become apparent in the following detailed description, the present invention will be clearly understood in connection with the accompanying drawings, in which.

The principle of the measurement of the present invention is as follows:

If sudden temperature change occurs in the gas while constant frequency sound waves are passing through the gas, the frequency of the sound waves undergo a frequency change after passing through the gas. This phenomena resembles the Doppler effect of the sound waves, although fundamentally different. When the gas temperature change $dT/dt$ is positive, that is, when the temperature is increasing, the sound waves passing through the gas increase their frequency, while when the gas temperature change $dT/dt$ is negative, that is, when the gas temperature is decreasing, the sound waves decrease their frequency.

Acoustic velocity is a function of the gas temperature.

For an ideal gas, or a real gas where the temperature and pressures are not too high, $$a = \sqrt{\frac{\gamma R T}{m}} \quad (1)$$

where $\gamma$ is the specific heat; R, the universal gas constant, T, the absolute gas temperature, $a$, the acoustic velocity, and $m$, the molecular weight of the gas. Since $\gamma$ and R of the ideal gas are always constant, the absolute temperature of the gas is readily obtained from the Formula 1 once the acoustic velocity is determined.

Generally, the characteristics of existing gases are similar to the characteristics of the ideal gas, and therefore Formula 1 is applicable thereto. Acoustic-velocity can be represented as a function of the absolute temperature almost all the time, namely, $$a = F(T) \quad (2)$$

Therefore, even when Formula 1 cannot be applied, the absolute temperature T can always be determined from Formula 2, once the acoustic velocity is determined. Precise measurements can be readily achieved as long as the measurement of acoustic velocity is executed with good care as to be accomplished by the present invention.

Referring now to the drawings, and more particularly to FIGS. 1 through 6, illustrating schematically an apparatus of the present invention for measuring the temperature of a suddenly changing combustion gas temperature in reciprocating engines, basically the present invention makes use of the principles that constant frequency acoustic waves or ultrasonic waves from a sound generator change their frequency at the receiver after passing through a temperature varying gas, and that acoustic velocity is a function of the absolute temperature. Accordingly, suddenly varying gas-temperature measurements can be achieved, as will hereinafter be explained.

In order to measure a suddenly varying gas-temperature, in accordance with the present invention, in an internal combustion engine, acoustic or ultrasonic waves having a constant frequency are discharged into the temperature varying gas so that the frequency can be measured by a receiver, in a manner such that the varying gas-temperature may be readily obtained from the frequency-change of the received sound-waves as will hereinafter be described in further detail.

Figure 1:
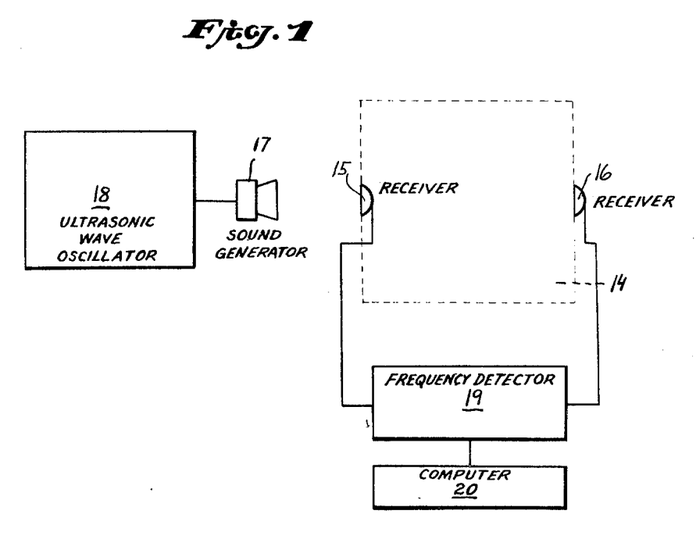
FIGURE 1 is a schematic view of a measuring apparatus in accordance with the present invention for measuring suddenly varying gas temperatures.

Referring now particularly to FIG. 1 illustrating generally an apparatus adapted to measure suddenly varying gas-temperatures in accordance with the present invention, receivers 15 and 16, respectively, are set at both sides of a gas 14, the temperature of which is to be measured. The distance between the receivers 15 and 16 is L. A sound generator 17, driven by a constant-frequency ultrasonic wave oscillator 18, is axially aligned with both receivers so that ultrasonic waves can be discharged from the sound generator 17 along an axial line between the receivers 15 and 16.

Figure 2:
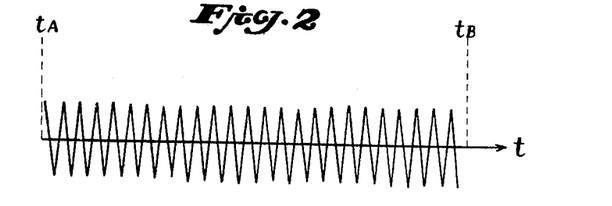
FIG. 2 is a graph of acoustic or ultrasonic waves of constant frequency before entering the gas medium with the abscissa representing time $t$.

Referring also to FIG. 2, ultrasonic waves of a constant frequency are shown entering receiver 15 before passing through the gas. Times $t_A$ and $t_B$ represent the beginning and end of a measuring time interval, respectively, and accordingly, in the case where the phenomenon is periodic, the time interval $t_A$ to $t_B$ should be considered as one period of time.

The frequency of the acoustic waves in accordance with the present method is selected to be necessarily larger than that of the varying temperature.

If the gas temperature remains constant between the time period $t_A$ to $t_B$ (which is not the case in FIG. 3), the frequency of the ultrasonic waves received by the receiver 16 and the frequency of the waves received by the receiver 15 would be exactly the same, corresponding to each other, as indicated by the constant spacing of the waves in FIG. 2. The acoustic velocity also would be constant in this case.

Figure 3:
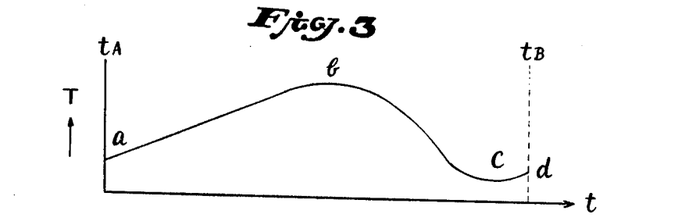
FIG. 3 is a graph showing a gas temperature T as a function of time $t$ illustrating suddenly varying gas temperatures to be measured.
Figure 4:
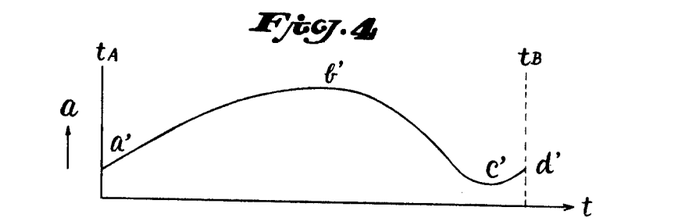
FIG. 4 is a graph of acoustic velocity variation corresponding to the gas and temperature variation of FIG. 3.

However, if the gas-temperature varies with time, as shown in FIG. 3, the acoustic velocity, $a$, varies, in accordance with Formula 1 or 2, as represented by FIG. 4.

Figure 5:
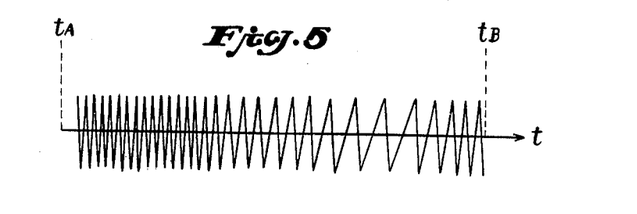
FIG. 5 is a graph of the acoustic waves after passing through the gas of FIG. 3.

Referring now again to the drawings, and more particularly to FIGS. 2–5, if the temperature T varies according to curve portions, $a$ and $b$ (FIG. 3), and the acoustic velocity varies correspondingly, according to curve portions $a'$ and $b'$ (FIG. 4), then the frequency of the ultrasonic waves received by the receiver 16 of FIG. 1 increases (as shown in FIG. 5) due to an increase in the acoustic velocity. The ultrasonic waves received by the receiver 16 in the neighborhood of the maximum temperature $b$ (maximum acoustic velocity $b'$), as illustrated in FIG. 5, has the same frequency as that of the ultrasonic waves received by the receiver 15, since at that instant the temperature is constant. With the temperature and the acoustic velocity varying according to curves $b$, $c$ and $b'$, $c'$, respectively, the frequency of the ultrasonic waves (FIG. 5) received by the receiver 16 is decreased in comparison to the frequency received by the receiver 15, because the acoustic velocity decreases with the inverse of time.

The ultrasonic waves received at receiver 15 have the constant frequency $f$ (represented by FIG. 2), and the same ultrasonic waves thereafter received in receiver 16, after passing through the gas, have a variable frequency $f_2(t)$ caused by the temperature changes of the gas.

By this frequency change phenomenon, directly caused by temperature change, the ultrasonic waves received by receiver 16, as shown in FIG. 5, can be measured to provide a determination of the variation of the acoustic velocity, $a$, for any time instant, and therefrom the instantaneous gas temperature T can be obtained from Formula 1 or 2.

Figure 6:
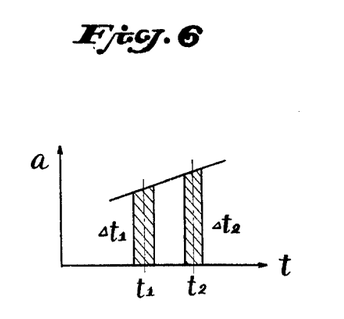
FIG. 6 is an enlarged incremental portion of the acoustic velocity variation of FIG. 4, representing portions before entering the gas and after passing therethrough.

Referring now again to the drawings, and more particularly to FIG. 6, the above method will now be further explained mathematically. As indicated above, the absolute temperature T of a gas changing with time is illustrated in FIG. 3 (although in no manner is the present invention limited to such specific variation). The acoustic velocity, which also, has been heretofore indicated, is a function of the absolute temperature, F(T), and is represented in FIG. 4 corresponding to the temperature T variation of the gas of FIG. 3.

FIG. 6 represents a subdivided, small part of the curve of FIG. 4. $\Delta t_1$ represents one periodic wave cycle of the sound waves which are at the receiver 15 at an instant $t_1$, and $\Delta t_2$ represents one periodic wave cycle of this same sound wave at instant $t_2$ when the waves reach receiver 16 after passing through the gas, which has undergone a change in frequency and wave length.

Since the distance between the receivers 15 and 16, respectively, is L, then, since L = rate × time, $$L = \int_{t_1}^{t_2} a\,dt = \int_{t_1 - \frac{\Delta t_1}{2}}^{t_2 - \frac{\Delta t_2}{2}} a\,dt = \int_{t_1 + \frac{\Delta t_1}{2}}^{t_2 + \frac{\Delta t_2}{2}} a\,dt \quad (3)$$

and since the individual integrals may be expressed as $$\int_{t_1 - \frac{\Delta t_1}{2}}^{t_2 - \frac{\Delta t_2}{2}} a\,dt = \int_{t_1 - \frac{\Delta t_1}{2}}^{t_2 + \frac{\Delta t_1}{2}} a\,dt + \int_{t_1 + \frac{\Delta t_1}{2}}^{t_2 - \frac{\Delta t_2}{2}} a\,dt$$

$$\int_{t_1 + \frac{\Delta t_1}{2}}^{t_2 + \frac{\Delta t_2}{2}} a\,dt = \int_{t_1 + \frac{\Delta t_1}{2}}^{t_2 - \frac{\Delta t_2}{2}} a\,dt + \int_{t_2 - \frac{\Delta t_2}{2}}^{t_2 + \frac{\Delta t_2}{2}} a\,dt$$

and each include $$\int_{t_1 + \frac{\Delta t_1}{2}}^{t_2 - \frac{\Delta t_2}{2}} a\,dt$$

therefore, $$\int_{t_1-\frac{\Delta t_1}{2}}^{t_1+\frac{\Delta t_1}{2}} a\,dt = \int_{t_2-\frac{\Delta t_2}{2}}^{t_2+\frac{\Delta t_2}{2}} a\,dt \qquad (4)$$

That is, by the above formula and with reference to FIG. 6, the two hatched areas bounded, equal each other. Now, approximately $\Delta t_1$, and $\Delta t_2$ as infinitesimal time intervals and by the straight line approximation of the acoustic velocity curve in FIG. 6, it follows that $$a(t_1)\Delta t_1 = a(t_2)\Delta t_2$$

or, $$\frac{a(t_2)}{a(t_1)} = \frac{\Delta t_1}{\Delta t_2} \qquad (5)$$

where $a(t_1)$ and $a(t_2)$ represent the acoustic velocity at times $t_1$ and $t_2$, respectively, namely at the centers of the hatched areas, respectively.

Since $\Delta t_1$ is the time interval for one wave cycle at receiver 15, then by definition $$\Delta t_1 = \frac{1}{f_1}$$

where $f_1$ is the frequency of the waves at receiver 15 (in cycles per unit time), $1/f_1$ being the time interval per wave cycle or $\Delta t_1$. Similarly, $$\Delta t_2 = \frac{1}{f_2}$$

where $f_2$ is the frequency of the waves reaching receiver 16.

Therefore, $$f_1 \Delta t_1 = f_2 \Delta t_2 = 1$$

and $$\frac{f_2}{f_1} = \frac{\Delta t_1}{\Delta t_2}$$

whereupon, substituting the above in Equation 5, $$\frac{f_2}{f_1} = \frac{a(t_2)}{a(t_1)} \qquad (6)$$

For the reason that the instants $t_1$ and $t_2$ are mutually adjacent instants, it is reasonable that instant $t$ at a central position between $t_1 \sim t_2$ in FIG. 6 is a representative instant between the instants $t_1$ and $t_2$. Because the frequency at the sound source is constant, notation $f_0$ is used hereinafter instead of $f_1$. Then the following is derived using notation $\Delta f = f_2 - f_1$.

$$\frac{\Delta f}{f_0} = \frac{f_2 - f_1}{f_1} = \frac{a(t_2) - a(t_1)}{a(t_1)} =$$

$$\frac{\frac{a(t_2) - a(t_1)}{t_2 - t_1}(t_2 - t_1)}{a(t_1)} = \frac{da}{dt}\frac{L}{a(t)} \qquad (7)$$

Here, the approximation $$\frac{a(t_2) - a(t_1)}{t_2 - t_1} = \frac{da}{dt}$$

and $$t_2 - t_1 = \frac{L}{a(t)}$$

were used in the derivation.
Accordingly $$\frac{\Delta f}{f_0} = \frac{L}{a^2}\frac{da}{dt} \qquad (8)$$

This equation is the fundamental expression of the measuring method and apparatus of the present invention. Equation 8 shows that the frequency change $\Delta f$ at the receiver is proportional to the differentiation of the sound velocity with respect to time and distance L and is conversely proportional to the square of the sound velocity.

The curve of measured frequency $f$ at the receiver in FIG. 1 must satisfy Equation 8 under the condition that the time interval $t_2 - t_1$ is very small compared with the time interval of the whole temperature change.

Substitution of Equation 1 into Equation 8 leads to $$\frac{\Delta f}{f_0} = \frac{L}{2\left(\frac{\gamma RT}{m}\right)^{1/2}T}\frac{dT}{dt} \qquad (9)$$

Using the initial condition that the temperature T is $T_0$ at the time $t=0$, the integration of Equation 9 leads to the following:

$$\frac{T}{T_0} = \left\{1 - \frac{\left(\frac{\gamma RT_0}{m}\right)^{1/2}}{L}\int_0^1 \frac{\Delta f}{f_0}dt\right\}^{-2} \qquad (10)$$

The frequency $f(=f_0 + \Delta f)$ of the sound waves received at the receiver 16 in FIG. 1 is the objection for measurement when the temperature T of the gas changes as expressed in FIG. 1 while frequency of the sound source $f_0$ is constant.

By measuring the frequency $\Delta f$ by frequency detector 19 and using Equation 10 in computer 20, it is possible to obtain the absolute gas temperature T as a function of the time $t$.

When it is desired to get the rate of the change of temperature with respect to time $(=dT/dt)$, the following equation has to be used:

$$\frac{d\left(\frac{T}{T_0}\right)}{dt} = \frac{\frac{2\left(\frac{\gamma RT_0}{m}\right)^{1/2}}{L}\frac{\Delta f}{f_0}}{\left\{1 - \frac{\left(\frac{\gamma RT_0}{m}\right)^{1/2}}{L}\int_0^t \frac{\Delta f}{f_0}dt\right\}^3} \qquad (11)$$

Ultrasonic waves are preferred as the sound waves because of the following merits:

(1) By using ultrasonic waves, it is easy to avoid the mixing of the noises from the environment.

(2) Precision of the measurement is increased owing to their high frequency.

(3) Good directivity of the ultrasonic waves minimizes the interferences and the reflection of the waves.

Figure 7:
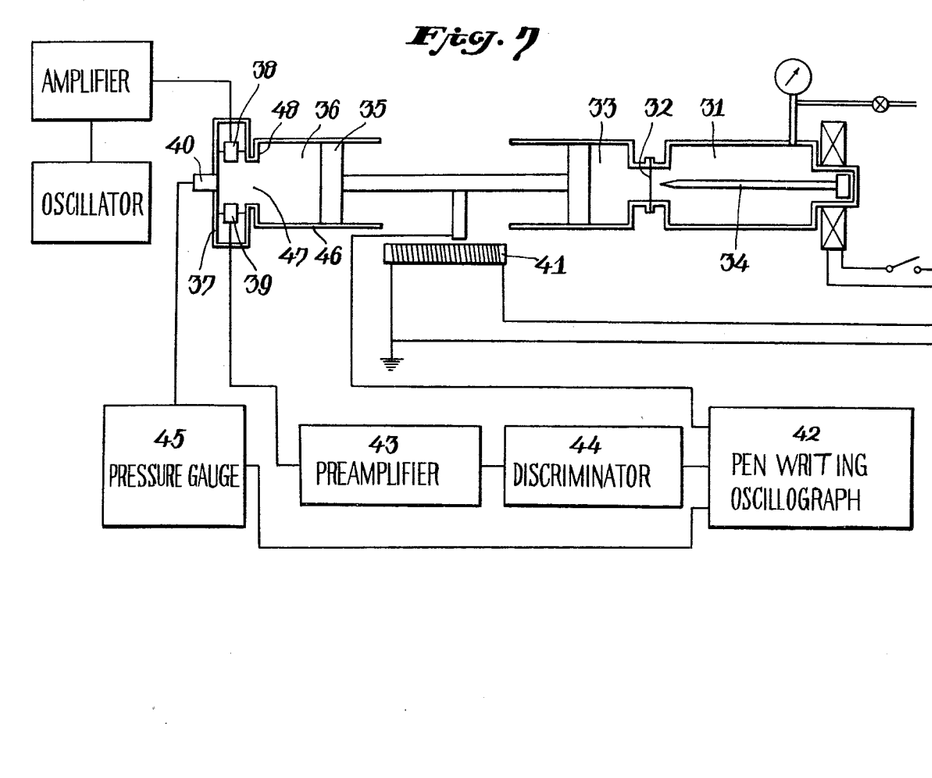
FIG. 7 is a schematic view of a rapid compression machine illustrating an apparatus designed in accordance with the present invention for measuring suddenly varying gas temperature and showing the associated electrical system.
Figure 8:
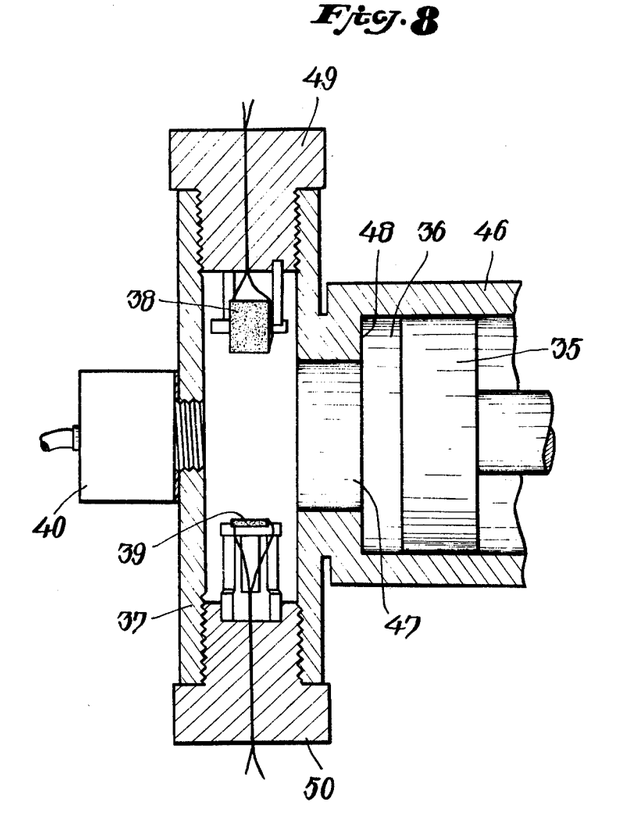
FIG. 8 is an enlarged fragmentary view of the ultrasonic generator and receiver portions of FIG. 7.
Figure 9:
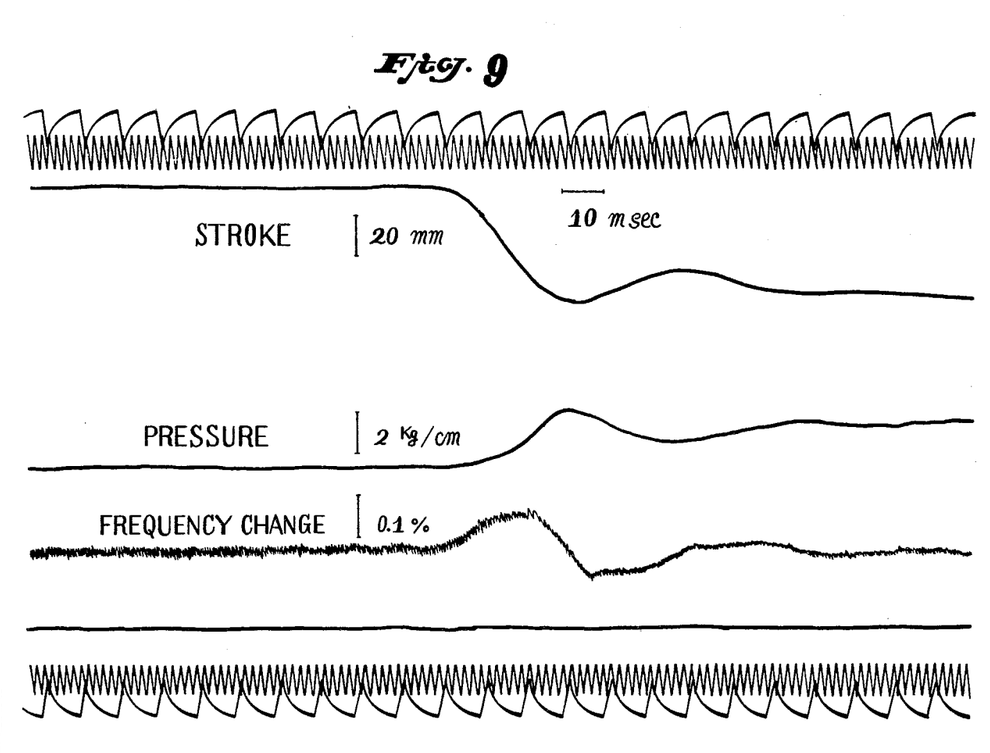
FIGS. 9–12 are graphs showing data obtained from the apparatus of FIG. 7 for accumulator pressures in kg./cm.$^2$ gauge of 2, 3, 4 and 5, respectively.
Figure 10:
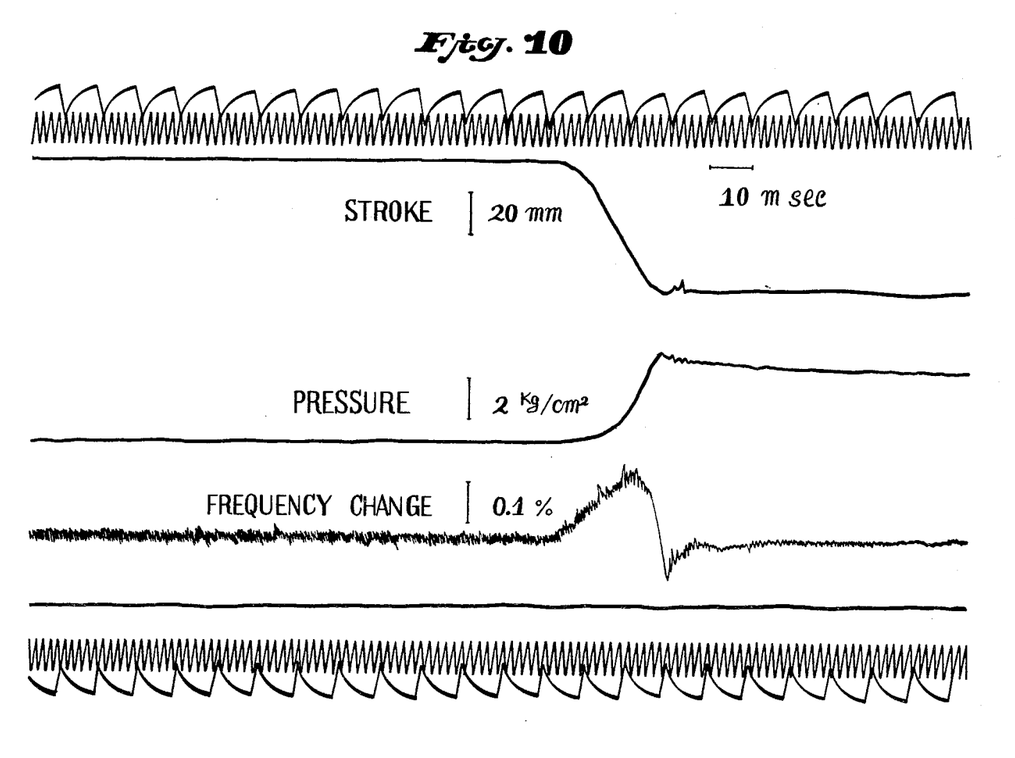
Figure 11:
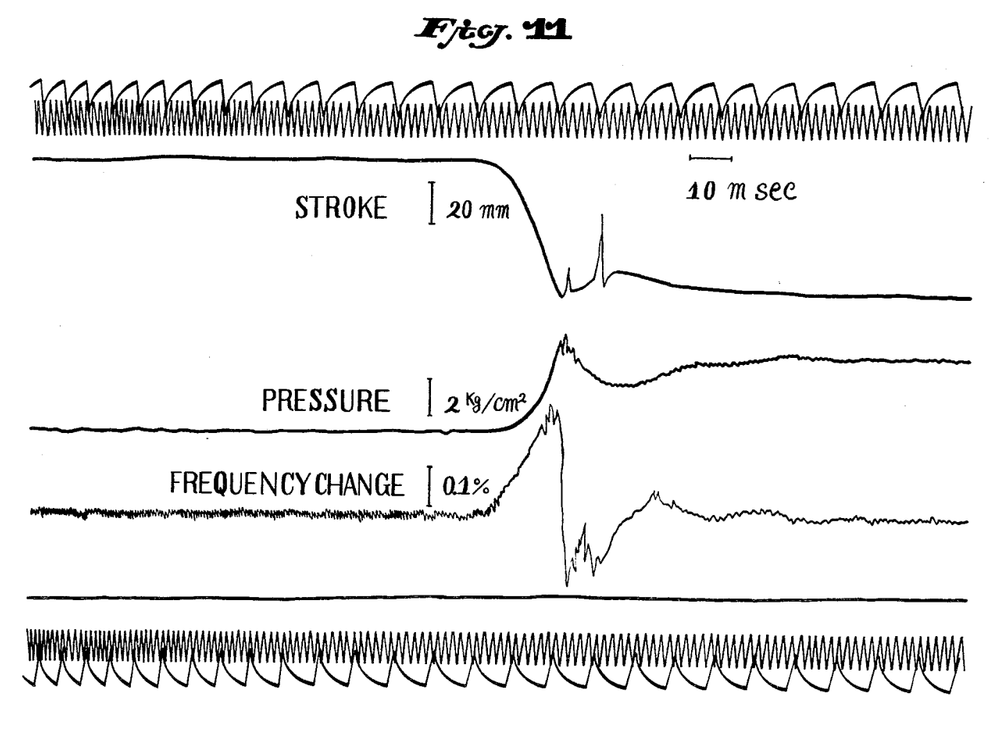
Figure 12:
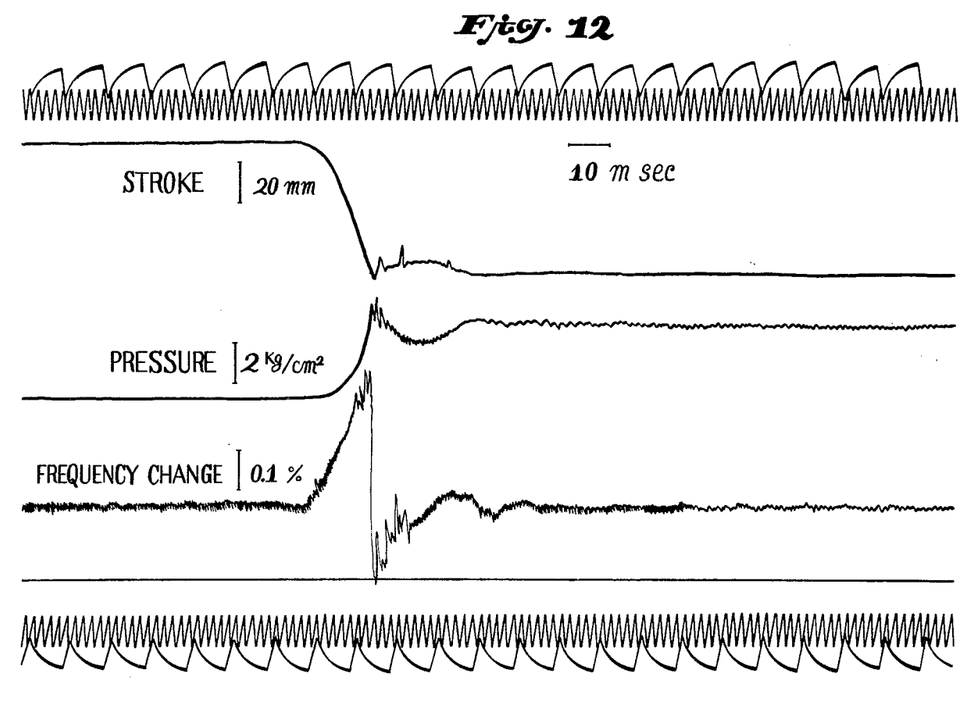
Figure 13:
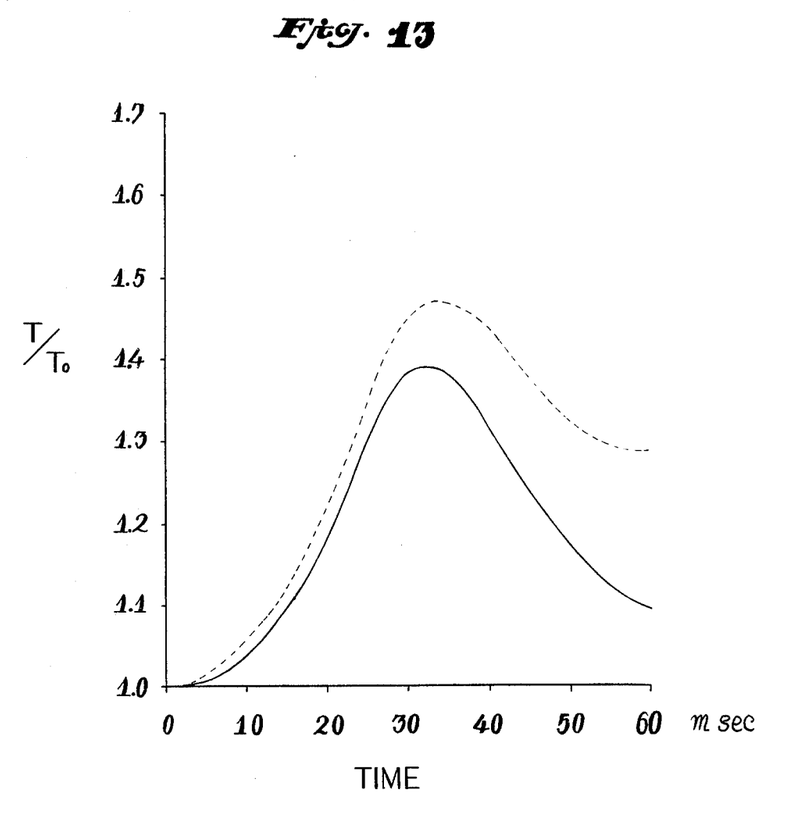
FIGS. 13–16 are graphs showing temperature ratios obtained by the present invention corresponding to the pressures of FIGS. 9–12, respectively.
Figure 14:
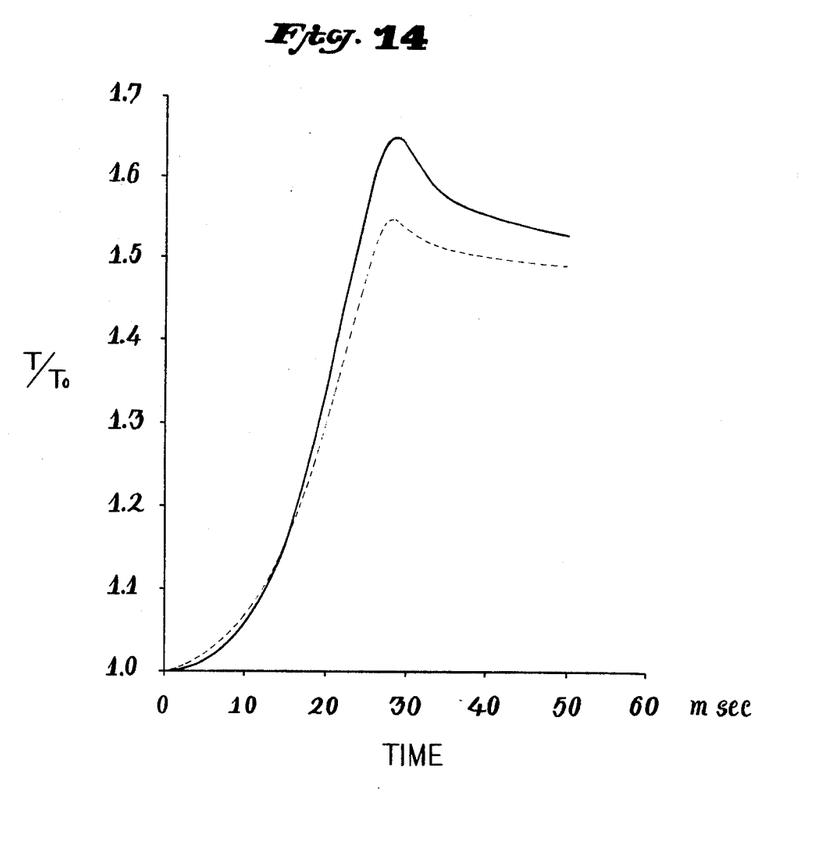
Figure 15:
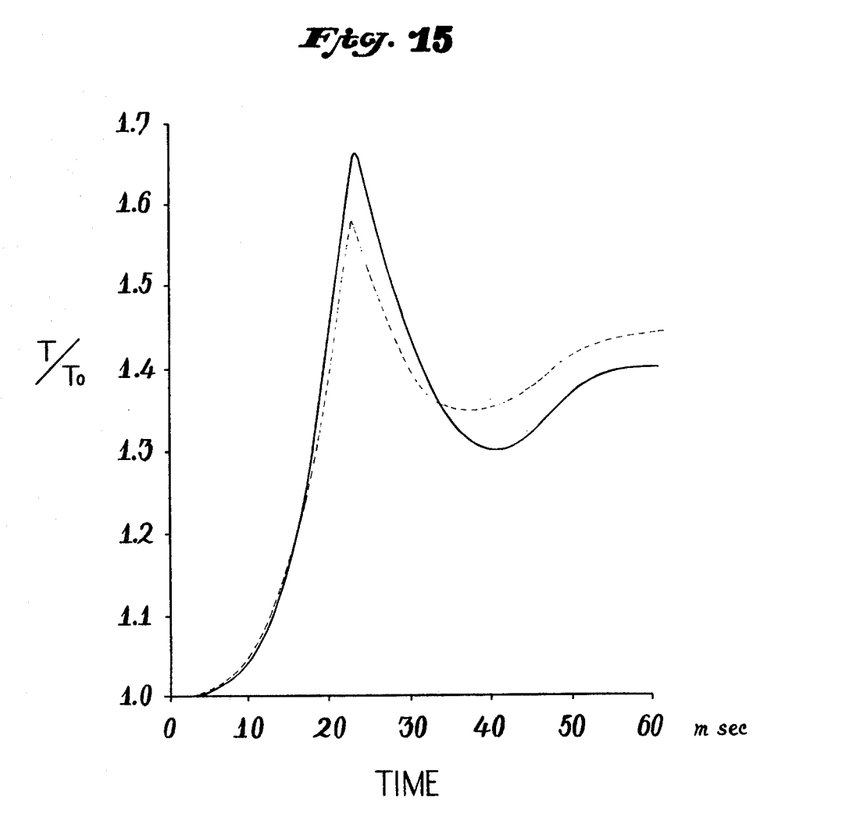
Figure 16:
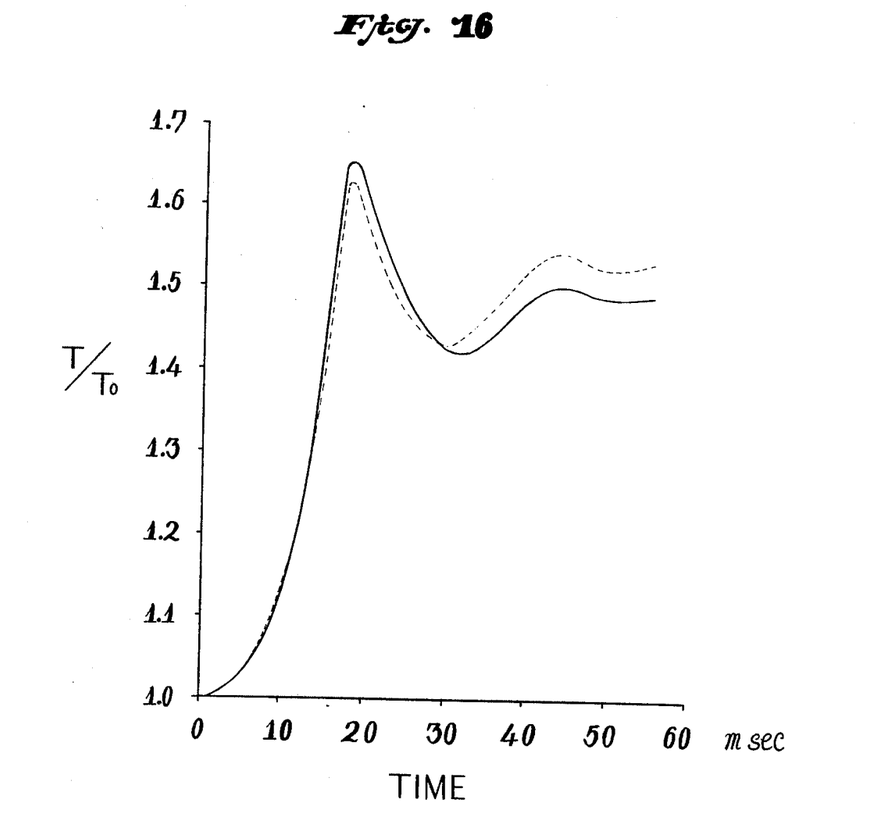

Referring now again to the drawings, and more particularly to FIG. 7, for an illustrative, actual measuring apparatus and method in a rapid compression machine showing the accompanying electrical circuits therefor, compressed air is filled in an accumulator 31, which is separated by a cellophane membrane 32 to the adjacent chamber 33. By suddenly breaking of this membrane 32 with a needle 34, the compressed air flows out, and pushes piston 35 and compresses the air in air chamber 36. At the upper part of the air chamber there is a cylindrical portion 37 containing a sound source 38 and a receiver 39 made with barium titanate. The cylindrical chamber 37 contains the gas for measurement of the varying gas temperatures. Further details of this equipment are shown in FIG. 8. The barium titanate for the sound source and the receiver are set up on Teflon elastically so as to be shielded from outer vibrations and acoustic noises.

As shown in FIGS. 7 and 8, the piston cylinder 46 has a rear opening 47. Radially inwardly directed annular end walls 48 are provided at the periphery of the opening having an inner diameter smaller than that of the outer diameter of the piston 35 and an outer diameter equal to that of the piston 35. Beyond the opening 47, is disposed the measurement chamber 37 communicating with the opening 47 to receive therein the gas to be measured. The chamber 37 is cylindrical and coaxially arranged relative the piston cylinder 46, although the present invention is not limited thereto. Oppositely disposed along a common diameter are the sound generator 38 and the sound receiver 39. As shown in FIG. 8, the walls forming the chamber 37 constitute a separate unit from the piston cylinder 40 and are adapted to be mounted in the opening 47 thereof defining the end walls 48. The generator 38 may be positioned by screw threaded carrying members 49 and 50, respectively.

An illustrative measurement and example will now be given.

The cylindrical chamber 37 has a diameter of 80 mm. and a length of 24 mm. The temperature of the gas in the chamber is raised through the polytropic compression of the gas and at this instant the receiver receives the ultrasonic waves which undergo the frequency change while passing therethrough.

Electrical signals from the receiver are amplified by pre-amplifier 43 and pass through discriminator 44 and an integrator (not shown), and finally the frequency change $\Delta f/f_0$ and the integrated frequency change $$\int \frac{\Delta f}{f_0} dt$$

are recorded by pen-writing oscillograph 42.

In these electrical circuits, full care is taken in filtering the electrical and mechanical noises from all sorts of sound sources. For instance, the electrical output of the receiver originating from the pressure change of the air is filtered.

The stroke of the piston is detected by the sliding resistor 44 and the output of the sliding resistor is fed to the pen-writing oscillograph 42.

For comparison of the measured temperature data of this new technique with the temperature derived from measured pressure using polytropic change equation, a pressure pick-up 40 was attached at the central position of the chamber 37, and the pressure is recorded by the pen-writing oscillograph through pressure monitor 45. The barium titanate piece for the sound source had a thickness of 13 mm. and a diaheter of 10 mm. and the receiver had a thickness of 2 mm. and a diameter of 10 mm. They were 38 mm. apart, that is, length L equals 38 mm.

Before performing the measurement, it is necessary to check whether the dimensions of the apparatus satisfy the condition of approximation for Equation 8. The condition of approximation is that the time for the sound waves to pass the length L must be sufficiently small compared with the time interval of the total temperature change phenomena. In this experiment, the time for the sound waves to go length L is approximately $$\frac{L}{a_0} = \frac{0.038}{340} = 1.12 \times 10^{-4} \text{ sec.}$$

On the other hand, the time interval of total temperature change phenomena is approximately $3.0 \times 10^{-2}$ sec.

From the above values, it is clear that the dimensions herein satisfy the condition.

The measurement of the motion of the piston 35 which shows the specific volume change is made by the voltage of sliding resitsor 41 as shown in FIG. 7.

The objects of the measurement are the ultrasonic frequency from the receiver, the output from the pressure pick-up and the voltage from the sliding resistor which are all recorded by pen-writing oscillograph 42.

The measurements were done by changing the compressed air pressure in the accumulator. The frequency of the ultrasonic wave from the sound source was 180 kc./s. Data of the measurements are shown in FIGS. 9–12. The curves of stroke, pressure and frequency change are shown against time in these figures. It is apparent that the curve of the frequency change is analogous to the differentiation of the pressure curve with respect to time. It appears that the higher the pressure of the accumulator the larger the frepuency change.

It is observed that the curves of the frequency change contain very high frequency waves or noises. It seems that they occur by the pressure waves from the moving piston or by the vibrations of the structure. It is interesting that these noises are filtered and the curves become smooth when the integration with respect to time are performed electrically.

The temperature of the air is calculated from Equation 10 using the measured frequency change, and is also calculated from the polytropic change of the air using the polytropic index estimated from the measured stroke and pressure, and both are compared in FIGS. 13–16 as solid lines and broken lines, respectively. Coincidence of the two lines are good especially for high pressures. This is due to the fact that in the case of high accumulator pressure the measurement of the frequency and pressure are easy accurately achieved. The polytropic index is calculated from log-log curve of stroke and pressure and only one value is selected for one experiment. Therefore it is natural that the two curves are not coincident at the rear part.

The coincidence between the two lines of temperature change is especially good in the beginning portion of each curve. This is due to the fact that the polytropic index for the calculation of polytropic equation is determined by the starting part of log-log relations of the stroke and the pressure. The coincidence between the full and broken lines proves that the data obtained by this new measuring technique of the present invention are reliable.

In accordance with the present invention it is possible to measure rapidly changing gas temperature by detecting the frequency change of the sound waves passing through the temperature changing gas.

It is necessary that ultrasonic waves be used for the sound waves and that the time for the ultrasonic waves to travel the distance between the sound source and the receiver be very small compared with the total time interval of the temperature change phenomena.

From the experiment using the rapid compression machine, it is concluded that the temperature change of about several tens of thousands degrees centigrade/second can be measured by the present invention.

Although, as illustrated, the distance between the sound source and the receiver was 38 mm. and their diameters were both 10 mm., it is possible to make these dimensions much smaller by proper design and arrangement.

For the above reasons, the measurement of the combustion gas in reciprocating engines using this new technique is possible by cooling the sound source 38 and the receiver 39.

The apparatus in accordance with the invention and of FIG. 8 may be readily adapted as shown for incorporation in a reciprocaiing engine for measuring sudden variations in gas temperature therein; the portion to the right of the break line at the right hand side of FIG. 8 may be viewed as constituting an actual reciprocating engine (not shown).

The constant frequency of the ultrasonic waves may be conducted directly from the sound generator 17 in stead of using a receiver 15 to frequency detector 19 for comparison with the changed frequency at reeciver 16 from which the suddenly varying gas temperature may be calculated by computer 20.

While we have disclosed several embodiments of the present invention, it is to be understood that these embodiments are given by example only, and not in a limiting sense, the scope of the present invention being determine by the objects and the claims.

We claim:
1. In a reciprocating engine having a piston cylinder and a reciprocating piston, an apparatus for measuring the suddenly varying combustion gas temperature therein comprising:
 a chamber communicating with the piston cylinder,
 a constant frequency ultrasonic sound generator means disposed within said chamber for discharging constant frequency ultrasonic waves through said chamber,
 receiver means disposed within said chamber spaced from said sound generator means for detecting the frequency of said sound waves after passing through at least part of said chamber, said sound waves upon passing through said chamber undergoing a change in frequency in response to the temperature variation in said chamber, and circuit means connected to said receiver means disposed outside of said chamber for determining the temperature variation of the gas from said frequency variations of said sound waves.

2. The apparatus, as set forth in claim 1, wherein: the distance between said sound generator means and said receiver means is such that the time for the sound waves to pass therebetween is sufficiently small compared with the time interval of the total temperature change.

3. The apparatus, as set forth in claim 1, further comprising:

walls defining said chamber, said chamber being cylindrical and coaxial disposed relative to said piston cylinder, and said walls having open cylindrical flanged ends adapted to coaxially complementarily fit into said piston cylinder thereby communicating said piston cylinder with said chamber.

4. The apparatus, as set forth in calim 3, further comprising:

two screw-threaded mounting members, one carrying said ultrasonic sound generator means and the other carrying said receiver means and adapted to be circumferentially screwed into said walls along a common diameter from opposite positions facing each other.

References Cited

UNITED STATES PATENTS 2,099,687   11/1937   Hartig.
2,834,236   5/1958   Pardue et al. _____ 73—67.6 XR JAMES J. GILL, Primary Examiner U.S. Cl. X.R.

73—67.6